United States Patent [19]
Brown et al.

[11] Patent Number: 4,680,329
[45] Date of Patent: Jul. 14, 1987

[54] BLENDS OF POLYPHENYLENE ETHERS WITH PHOSPHORUS-CONTAINING POLYMERS

[75] Inventors: Sterling B. Brown; Dennis J. McFay, both of Schenectady, N.Y.

[73] Assignee: General Electric Company, Schenectady, N.Y.

[21] Appl. No.: 766,626

[22] Filed: Aug. 19, 1985

[51] Int. Cl.$^4$ ................................................ C08L 7/04
[52] U.S. Cl. .................................... 524/143; 524/380; 524/394; 524/399; 524/400; 524/504; 524/508; 525/68; 525/132; 525/150; 525/152
[58] Field of Search ............... 524/508, 380, 394, 399, 524/400, 143, 504

[56] References Cited

U.S. PATENT DOCUMENTS 3,943,085  3/1976  Kraft .................................... 524/508
4,537,925  8/1985  Luxon .

FOREIGN PATENT DOCUMENTS 0018212  4/1980  European Pat. Off. .
136221  8/1984  European Pat. Off. .

OTHER PUBLICATIONS

Schroeder et al., *J. Poly. Sci.*, 47, 417–433 (1960).

Primary Examiner—C. Warren Ivy
Attorney, Agent, or Firm—William H. Pittman; James C. Davis, Jr.; James Magee, Jr.

[57] ABSTRACT

Polyphenylene ether resin compositions, optionally also containing polystyrenes, with improved impact properties and resistance to stress-cracking and delamination are prepared by blending with said resin at least one hydrocarbon polymer containing phosphorus acid or derivative (preferably phosphonate) groups and at least one fatty acid salt such as zinc stearate. Preferably, there are added to the blend at least one plasticizer (especially a triaryl phosphate) and at least one aromatic polymer containing acidic (especially sulfonic acid) substituents or salts thereof.

27 Claims, 7 Drawing Figures (I) 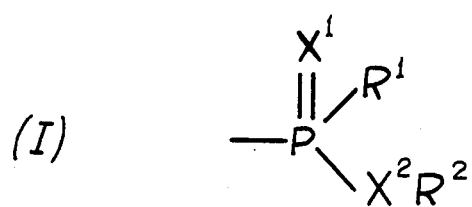
(II) 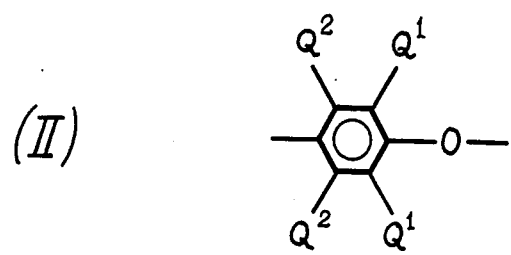
(III) 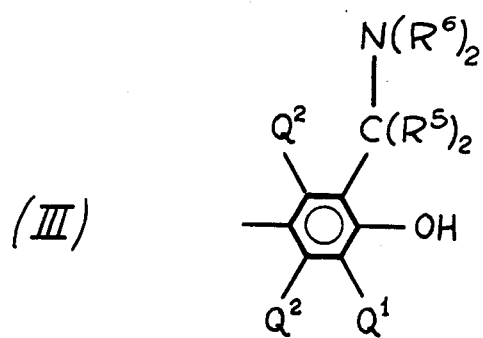
(IV) 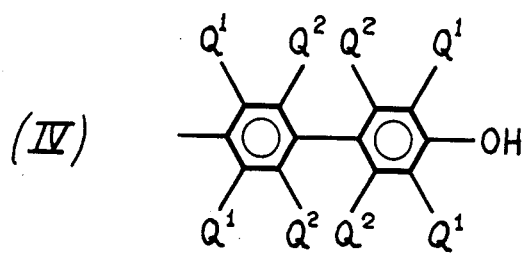

(V) 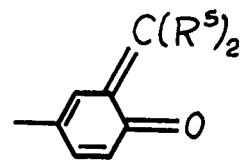
(VI) 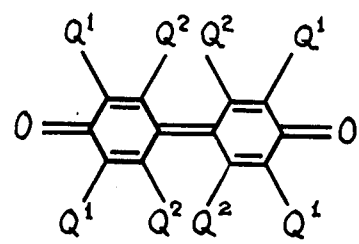
(VII) 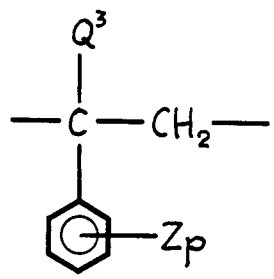

BLENDS OF POLYPHENYLENE ETHERS WITH PHOSPHORUS-CONTAINING POLYMERS

This invention relates to resinous compositions having improved impact properties and resistance to stress-cracking, and in particular to improved compositions comprising polyphenylene ether resins.

Polyphenylene ethers (also known as polyphenylene oxides) have found wide use as engineering resins. Their durability and strength have made them suitable for use in areas previously reserved for metals. The necessity for high performance in these areas requires continuing development in the direction of improving properties such as impact resistance and structural integrity.

Polyphenylene ethers are normally combined with vinyl aromatic polymers such as polystyrenes. The impact resistance and ease of processing of polyphenylene ether-polystyrene and similar systems have frequently been improved by the incorporation therein of a minor proportion of an olefin polymer, typically in combination with one or more plasticizers. It is sometimes found, however, that resinous compositions of this type undergo environmental stress-cracking during and after molding. They may also undergo delamination because of the low compatibility of the hydrophobic olefin polymer with the polyphenylene ether.

A principal object of the present invention, therefore, is to provide a new class of polymer blends.

A further object is to improve various properties of polyphenylene ethers, including impact resistance, without introducing other problems such as environmental stress-cracking and delamination.

A further object is to compatibilize hydrophobic polymers with polyphenylene ethers.

A still further object is to provide novel polymer blends suitable for use as engineering resins, said blends having a high degree of compatibility and other desirable properties caused by high particle adhesion.

Other objects will in part be obvious and will in part appear hereinafter.

In its broadest aspect, the present invention is directed to resinous compositions obtained by preparing a blend comprising a major proportion of (A) at least one polyphenylene ether, or a blend thereof with at least one polystyrene, and minor proportions of (B) at least one hydrocarbon polymer characterized by the presence within its molecular structure of 0.4–1.8% by weight of phosphorus as groups having formula I in the drawings, wherein $X^1$ is oxygen or sulfur; $R^1$ is lower alkyl (i.e., alkyl containing up to 7 carbon atoms) or $X^2R^3$; $X^2$ is OS or $NR^4$; each of $R^2$ and $R^3$ is one equivalent of a cation, lower alkyl, halo-substituted lower alkyl or silyl; and $R^4$ is hydrogen or lower alkyl; and (C) at least one fatty acid salt.

Reference is now made to the drawings which are chemical formulas for various structures of importance to the invention. These formulas are referred to hereinabove and hereinafter by Roman numeral where appropriate.

Component A comprises at least one polyphenylene ether. The polyphenylene ethers used in the present invention are a well known class of polymers widely used in industry as a result of the discovery by Allan S. Hay of an efficient and economical method of preparation. Since their discovery, they have given rise to numerous variations and modifications but still may, as a class, be generally characterized by the presence of aryleneoxy structural units. The present invention includes all of said variations and modifications, including but not limited to those described hereinafter.

The polyphenylene ethers generally comprise structural units having formula II in the drawings. In each of said units independently, each $Q^1$ is independently hydrogen, halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen Suitable polyphenylene ethers are disclosed in a large number of patents. The following are illustrative but not limiting:

| | | | |
|---|---|---|---|
| 3,226,361 | 3,330,806 | 3,929,930 | 4,234,706 |
| 3,234,183 | 3,390,125 | 4,028,341 | 4,334,050 |
| 3,257,357 | 3,431,238 | 4,054,533 | 4,340,696 |
| 3,257,358 | 3,432,466 | 4,092,294 | 4,345,050 |
| 3,262,892 | 3,546,174 | 4,097,556 | 4,345,051 |
| 3,262,911 | 3,700,630 | 4,140,675 | 4,374,959 |
| 3,268,478 | 3,703,564 | 4,158,728 | 4,377,662 |
| 3,306,874 | 3,733,307 | 4,207,406 | 4,477,649 |
| 3,306,875 | 3,875,256 | 4,221,881 | 4,477,651 |
| 3,318,959 | 3,914,266 | 4,226,951 | 4,482,697 |
| | | | 4,517,341. |

Both homopolymers and copolymers are included. Suitable copolymers include random copolymers containing, for example, 2,6-dimethyl-1,4-phenylene ether units in combination with 2,3,6-trimethyl-1 4-phenylene ether units, many of which are disclosed in various Hay patents. Also contemplated are graft copolymers, including those prepared by grafting onto the polyphenylene ether chain such vinyl monomers as acrylonitrile and vinylaromatic compounds (e.g., styrene), and by grafting other polymers such as polystyrenes and elastomers. Other suitable polymers are the coupled polyphenylene ethers in which the coupling agent is reacted with the hydroxy groups of two polyphenylene ether chains to increase the molecular weight of the polymer. Illustrative coupling agents are low molecular weight polycarbonates, quinones, heterocycles and formals.

The polyphenylene ether generally has a molecular weight (number average, as determined by gel permeation chromatography, whenever used herein) within the range of about 5,000–40,000; its intrinsic viscosity is most often in the range of about 0.45–0.5 dl./g., as measured in chloroform at 25° C.

The polyphenylene ethers may be prepared by known methods, typically by the oxidative coupling of at least one corresponding monohydroxyaromatic compound. A particularly useful and readily available monohydroxyaromatic compound is 2,6-xylenol (wherein each $Q^1$ is hydrogen and each $Q^2$ is methyl), whereupon the polymer may be characterized as a poly(2,6-dimethyl-1,4-phenylene ether).

Any of the various catalyst systems known in the art to be useful for the preparation of polyphenylene ethers can be used in preparing those employed in this invention. For the most part, they contain at least one heavy metal compound such as a copper, manganese or cobalt compound, usually in combination with various other materials.

A first class of preferred catalyst systems consists of those containing copper. Such catalysts are disclosed, for example, in the aforementioned U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Manganese-containing systems constitute a second preferred class of catalysts. They are generally alkaline systems containing divalent manganese and such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, $\omega$-hydroxyoximes (monomeric and polymeric), o-hydroxyaryl oximes and $\beta$-diketones. Also useful are cobalt-containing catalyst systems.

The following additional patents disclose manganese and cobalt-containing catalyst systems for polyphenylene ether preparation.

| | | |
|---|---|---|
| 3,956,242 | 4,083,828 | 4,184,034 |
| 3,962,181 | 4,093,596 | 4,315,086 |
| 3,965,069 | 4,093,597 | 4,335,233 |
| 3,972,851 | 4,093,598 | 4,385,168 |
| 4,058,504 | 4,102,865 | |
| 4,075,174 | 4,110,312. | |

Particularly useful polyphenylene ethers for the purposes of this invention are those which comprise molecules having at least one of the end groups of formulas III and IV, wherein $Q^1$ and $Q^2$ are as previously defined; each $R^5$ is independently hydrogen or alkyl, with the proviso that the total number of carbon atoms in both $R^5$ radicals is 6 or less; and each $R^6$ is independently hydrogen or a $C_{1-6}$ primary alkyl radical. Preferably, each $R^5$ is hydrogen and each $R^5$ is alkyl, especially methyl or n-butyl.

Polymers containing the aminoalkyl-substituted end groups of formula III may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the $\alpha$-hydrogen atoms on one or more $Q^1$ radical. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of formula V, with numerous beneficial effects often including an increase in impact strength and compatibilization with other blend components. Reference is made to the aforementioned U.S. Pat. Nos. 4,054,553, 4,092,294, 4,477,651 and 4,517,341.

Polymers with biphenol end groups of formula IV are typically obtained from reaction mixtures in which a by-product diphenoquinone of formula VI is present, especially in a copper-halide-secondary or tertiary amine system. In this regard, the disclosures of the aforementioned U.S. Pat. Nos. 4,234,706, 4,477,649 and 4,482,697 are particularly pertinent. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer contain end groups having one or frequently both of formulas III and IV.

To insure completeness of disclosure and to facilitate an understanding of the scope of the present invention, the relevant disclosures of all of the patents listed hereinabove are incorporated by reference herein.

Component A preferably also contains at least one polystyrene. The term "polystyrene" is used broadly herein and includes resins comprising polymers which contain at least 25% by weight of structural units of formula VII, wherein $Q^3$ is hydrogen, lower alkyl or halogen; Z is vinyl, halogen or lower alkyl; and p is from 0 to 5. These resins include homopolymers of styrene (frequently designated "crystal polystyrene"), chlorostyrene and vinyltoluene, random and block copolymers of styrene with one or more monomers illustrated by acrylonitrile, butadiene, $\alpha$-methylstyrene, ethylvinylbenzene, divinylbenzene and maleic anhydride, and rubber-modified polystyrenes comprising blends and grafts, wherein the rubber is a polybutadiene or a rubbery copolymer of about 98-70% styrene and about 2-30% diene monomer. These rubber-modified polystyrenes include high impact polystyrene, or HIPS.

The polyphenylene ethers and polystyrenes may be compatibly blended in all proportions, and proportions are not critical for the purposes of the invention. Most often, however, component A comprises about 10-90% by weight polyphenylene ether with the balance being polystyrene.

Component B is at least one hydrocarbon polymer which contains phosphorus in the form of groups of formula I, which may be phosphonic or phosphinic acid, salt, ester or amide groups or their thio analogs depending on the identity of the various X and R values. The following are illustrative:

| Type of group | $R^1$ | $R^2$ | $R^3$ | $X^1$ | $X^2$ |
|---|---|---|---|---|---|
| Phosphonic acid | $X^2R^3$ | H | H | O | O |
| Phosphonic ester | $X^2R^3$ | alkyl | alkyl | O | O |
| Phosphonamide | $X^2R^3$ | H, alkyl | H, alkyl | O | N |
| Thiophosphonic ester | $X^2R^3$ | alkyl | alkyl | S | S |
| Phosphinic acid | alkyl | H | — | O | O |
| Phosphinic ester | alkyl | alkyl | — | O | O |
| Phosphinamide | alkyl | H, alkyl | H, alkyl | O | N |
| Thiophosphinic ester | alkyl | alkyl | — | S | S |

It is generally found most convenient to employ polymers with phosphonic acid, salt or ester groups; i.e., those in which each of $R^2$ and $R^3$ is independently hydrogen, a metal or ammonium (including substituted ammonium) cation or lower alkyl and $X^1$ and $X^2$ are each O. Among the salts, metal salts are strongly preferred. While the identity of the metal is not critical, sodium and zinc, especially the latter, is usually most desirable.

The $R^2$ and $R^3$ values can also be halo-substituted, especially chloro-substituted, lower alkyl such as 2-chloroethyl, or a silyl group, especially organosilyl such as trimethylsilyl. Most often, however, $R^2$ and $R^3$ are hydrogen or lower alkyl, with methyl and ethyl being the preferred lower alkyl radicals.

Because of the above preferences and for brevity, component B is hereinafter frequently denoted "phosphonated polymer". It should be understood, however, that polymers containing phosphinate groups may also be used.

The phosphonated polymer contains structural units derived from one or more polymerizable hydrocarbons illustrated by aliphatic olefins containing from 2 to about 12 carbon atoms, such as ethylene, propylene, 1-butene, isobutene, 1-hexene and 2-ethyl-1-hexene; conjugated dienes such as butadiene or isoprene; and non-conjugated dienes such as 1,4-hexadiene or 5-ethylidenenorbornene. The preferred polymers are polyethylenes (particularly low-density polyethylenes) and ethylene-propylene copolymers, usually containing at least about 25% ethylene by weight. Other illustrative polymers are diene and EPDM rubbers.

An important feature of the invention is the phosphorus content of component B, which is 0.4–1.8% by weight. It has been found that compositions in which component B has a phosphorus level below 0.4% have undesirably low impact strengths, while polymers with a higher phosphorus content than 1.8% may be difficult or impossible to disperse uniformly in the composition and/or may have low impact strength.

Phosphonated polymers suitable for use as component B may be prepared by known methods. Examples of suitable polymers are the reaction products (in solution or in the melt) of olefin polymers under free radical conditions with phosphorus-containing olefinic compounds. Suitable compounds of this type include those listed in Sander et al., *J. Macromol. Sci., Revs.* (C), 1, 1 (1967) particularly Tables 4–8 on pp. 37–73 thereof. They include vinylphosphonic acid and its di-(lower alkyl) esters, in accordance with U.S Pat. No. 3,255,276 and Hartmann et al., *Z. Chem.*, 20, 146–147 (1980), as well as vinylphosphonyl dichloride which yields polymeric intermediates capable of hydrolysis or alcoholysis to the desired acids and esters. Also included are hydrolyzed or alcoholyzed reaction products of polyolefins with phosphorus trichloride and oxygen, as described in European Patent Application 18,212; and the reaction products (optionally hydrolyzed) of unsaturated polymers such as diene rubbers or EPDM's under free radical conditions with dialkyl phosphites, as disclosed in *Eur. Polym. J.*, 19, 1159–1165 (1983).

When component B is prepared by a reaction involving a phosphorus-containing unsaturated compound and free radical conditions, it may be obtained as a mixture with some homopolymer of said phosphorus-containing unsaturated compound. The presence of said homopolymer may adversely affect the impact properties of the compositions of this invention and also cause delamination of parts molded from said compositions. Therefore, any homopolymer of said phosphorus-containing unsaturated compound should be removed from the phosphonated hydrocarbon polymer, and this can be done by thoroughly washing with methanol in which the homopolymer is soluble but the phosphonated polymer is not.

It has been found that the impact strength of molded parts containing phosphonated polymers having olefinic bonds therein may deteriorate with the passage of time. This is believed to be caused by free radical-induced crosslinking through the olefinic bonds. It may be avoided by hydrogenating the polymer or by incorporating known antioxidants, such as hindered phenols, therein.

The following examples illustrate the preparation of phosphonated polymers useful as component B.

EXAMPLE 1

To a solution in 3 liters of chlorobenzene of 96.5 grams of an ethylene-propylene rubber containing 45% ethylene units and having a Mooney viscosity (ML-8) at 127° C. of 25 was added at 85° C. under nitrogen, with stirring, 27.9 ml. of diethyl vinylphosphonate and a solution of 6.67 grams of dicumyl peroxide in 63 ml. of chlorobenzene. The mixture was heated to reflux over 7 hours and cooled, after which two volumes of methanol was added with vigorous stirring. The precipitated polymer was removed by filtration, washed thoroughly six times with methanol to remove any diethyl vinylphosphonate homopolymer and dried in a vacuum oven at 75° C. It contained 0.67% phosphorus.

EXAMPLE 2

100 grams of a low density polyethylene having a melt index of 35 was dissolved in one liter of phosphorus trichloride in a nitrogen atmosphere at 73° C., with stirring. Oxygen was bubbled through the solution at 73° C. at about 0.4 SCFH (standard cubic feet per hour) for 1½ hours. The solution was cooled and distilled under vacuum, with xylene being added periodically to keep the volume at 1 liter. When about 1 liter of distillate had been collected, the mixture was cooled to room temperature and 1 liter of water was added slowly, with stirring. The mixture was stirred overnight and filtered, and the filtrate was dried in a vacuum oven at 70° C., boiled with three liters of methanol for 2 hours, filtered and washed again with methanol and dried overnight in a vacuum oven. The product contained 0.88% phosphorus.

EXAMPLE 3

A solution of 63.9 grams of "Vistalon 2504", a commercial EPDM rubber containing 50% ethylene units and 5% diene units, in 3 liters of toluene was heated under nitrogen to 86° C., with stirring, after which 120 grams of freshly distilled dimethyl phosphite was added. A solution of 0.61 gram of benzoyl peroxide in 90 ml. of toluene was added dropwise at 84° C. over 22 hours, with stirring, and heating was continued for two days. The mixture was diluted with two volumes of methanol with vigorous stirring, and the precipitated polymer was filtered, washed with methanol and dried in a vacuum oven at room temperature overnight. The phosphonated rubber thus produced contained 0.43% phosphorus.

Component C is at least one fatty acid salt, which serves as a plasticizer and also, apparently, as a reactant as described hereinafter. Suitable fatty acids include the aliphatic carboxylic acids, both saturated and olefinic but preferably saturated, containing about 10–30 carbon atoms.

The use of a salt as component C, rather than the free acid, is essential since compositions containing the free acid exhibit low impact strength and varying degrees of non-uniformity. Metal salts are strongly preferred, but (as with component B) the identity of the metal is not particularly critical.

Examples of fatty acid salts are calcium stearate, zinc laurate, zinc stearate, magnesium laurate and aluminum ricinoleate. Especially preferred are the sodium and zinc salts, most especially zinc stearate.

In a preferred embodiment of the invention, the compositions additionally comprise (D) at least one additional plasticizer, which facilitates molding and other working operations by lowering the melt viscosity of the composition.

A wide variety of plasticizers are suitable for use as component D. In general, they are polar materials melting at least 50° C. below the processing temperature of the resinous components of the composition; for systems containing a substantial amount of polyphenylene oxide, the plasticizer should melt no higher than about 190° C. It is also preferred that its volatility be sufficiently low to permit its retention in the composition during processing.

Typical plasticizers include compounds containing at least one of oxygen, phosphorus and nitrogen atoms, and compounds releasing a small polar molecule such as water or methanol at elevated temperatures. In addition to serving as plasticizers, compounds containing phosphorus may act as flame retardant additives.

Examples of oxygen-containing materials are organic acids and their salts and esters other than those present as component C, such as dimethyl sebacate and dimethyl phthalate, and alcohols, phenols and ethers such as hexyl alcohol, nonylphenol, resorcinol, benzyl alcohol and ethyl hexyl ether.

Illustrative phosphorus-containing compounds are triphenyl phosphate, tri-p-tolyl phosphate, tris(3,5-dimethylphenyl) phosphate, tributyl phosphate, triisopropyl phosphate and tetraalkylphosphonium p-toluenesulfonate. Nitrogen-containing materials include stearamide, p-toluenesulfonamide, diphenylurea, diphenylguanidine, di-o-tolylguanidine, piperazine, aniline, dihexylamine, diphenylamine, phenyl-$\beta$-naphthylamine and tetraalkylammonium p-toluenesulfonate. The triaryl phosphates are particularly preferred.

Polar molecule-releasing materials include various hydrates of simple and mixed oxides and salts such as lithium sulfate dihydrate, ammonium cerium sulfate octahydrate, ammonium chromium (III) sulfate dodecahydrate, ferric ammonium sulfate dodecahydrate, barium oxide octahydrate, bismuth dioxide dihydrate and the like, and alcoholates such as calcium chloride tetramethanolate.

In a highly preferred embodiment of the invention, there is also blended into the composition (E) at least one aromatic polymer containing acidic substituents with a $pK_a$ of at most about 5 or salts thereof. Such substituents and the polymers containing them are hereinafter sometimes referred to as "ionomeric substituent" and "ionomer", respectively. They are of particular value to compatibilize blends in which component A is a polyphenylene ether-polystyrene combination.

Component E is typically prepared from the polyphenylene ether or, preferably, the polystyrene described hereinabove with reference to component A. The substituents thereon are typically sulfonic acid (preferably) or carboxylic acid groups or salts thereof; the salts are preferred.

A characteristic property of the ionomers is their "degree of ionomerization", which is defined as the mole percent of ionomeric groups based on mers in the polymer; in other words, as the number of ionomeric mers per 100 mers. The degree of ionomerization of component E which is preferred for the purposes of this invention is within the range of about 0.5-10%, especially about 1-5%.

The ionomerization of the polymer may be achieved by known methods. For example, carboxylated polymers are typically obtained by polymerization of a monomer mixture which includes styrene in combination with an acid such as acrylic or methacrylic acid, or an ester thereof (e.g., ethyl acrylate, methyl methacrylate) in which the ester groups are subsequently hydrolyzed to free acid groups. A similar technique may be used for the preparation of sulfonated polymers, using such monomers as 2-sulfoethyl methacrylate, sodium styrenesulfonate and 2-acrylamido-2-methylpropanesulfonic acid. Sulfonate groups may also be incorporated in polymers of this type by reaction with sulfonating agents such as sulfur trioxide or acetyl sulfate. Illustrative sulfonation methods are disclosed in U.S. Pat. No. 3,870,841, the disclosure of which is incorporated by reference herein.

The preferred molecular weight ranges for the polymers which are ionomerized to produce component E are generally the same as those for component A.

The preparation of ionomeric polymers useful as component E in the compositions of this invention is illustrated by the following examples.

EXAMPLE 4

A solution of 76 ml. of acetic anhydride in 400 ml. of 1,2-dichloroethane was cooled to 10° C. and 48.9 grams of 95% sulfuric acid was added dropwise over 20 minutes. A 300-ml. portion of the resulting sulfonating agent was added dropwise at 50° C., over 10 minutes, to a stirred solution in three liters of 1,2-dichloroethane of 625 grams of a poly-(2,6-dimethyl-1,4-phenylene ether) having a molecular weight of about 20,000 and an intrinsic viscosity in chloroform at 25° C. of 0.48 dl./g. The mixture was stirred for 60 minutes, after which 200 ml. of methanol and a solution of 65 grams of zinc acetate in 200 ml. of water were added. The mixture was poured into an excess of methanol and the precipitated ionomer was removed by filtration and dried in a vacuum oven. There was obtained about 600 grams of the desired zinc salt of the sulfonated polyphenylene ether; it contained 1.4% sulfur and had a degree of ionomerization of about 5.3%.

EXAMPLE 5

The procedure of Example 4 was repeated, except that the 1,2-dichloroethane and polyphenylene ether were respectively replaced, on an equal weight basis, by methylene chloride and a styrene homopolymer having a molecular weight of about 106,000 and an intrinsic viscosity in toluene at 25° C. of 0.80 dl./g., and the sulfonation was effected at reflux temperature. There was obtained about 600 grams of the desired zinc salt of the sulfonated polystyrene; it contained 1.3% sulfur and had a degree of ionomerization of about 4.2%.

The amount of component B in the compositions of this invention may be any amount effective to provide the desired degree of impact resistance. The amount of component E may be an amount effective to maintain component B as a substantially stable disperse phase in component A. While it is within the scope of the invention for component B to be soluble in the resin system, solubility is not necessary and is frequently unattainable.

In general, the proportions of ingredients blended into the compositions of the invention are about 60–90% by weight of component A and about 10–40% of components B and E combined. When both are present, component B comprises about 2–20% and component E about 5–20%, based on total weight of the resinous components (i.e., of the combination of components A, B and E). Component C is generally present in the amount of about 5–20 phr. (parts by weight per 100 parts of resinous components) and component D, when present, at about 5–25 phr.

While the presence of additional plasticizer component D in the compositions of this invention may be desirable for the aforementioned purposes, the total plasticizer level should generally be no higher than necessary since tensile strength tends to decrease with increasing plasticizer level. One advantage of using a zinc salt as component C, rather than a salt containing another cation such as sodium, is that it frequently enables one to use a lower level of total plasticizer, thus increasing tensile strength.

The compositions of this invention are normally prepared by merely blending the components thereof under conditions adapted for the formation of an intimate blend. Such conditions often include extrusion, typically at temperatures in the range of about 100°–300° C., Extrusion is typically effected in a screw-type or similar extruder which applies a substantial shearing force to the composition, thereby decreasing the particle size thereof.

While the invention is not dependent on theory, it is believed that the improved properties afforded thereby are a result of reactions between component C and the phosphorus-containing groups to form phosphorus acid salt groups, combined with polar interactions with the ionomeric groups in component E if present. These interactions, coupled with the compatibility of components A and E as a result of their structural similarity by reason of the aromatic content thereof, are believed to constitute an effective bonding mechanism permitting the incorporation of the impact modifying species as a substantially stable disperse phase in component A. Such incorporation in turn minimizes delamination and similar types of physical failure.

In addition to the ingredients described in detail herein, the compositions of this invention can also contain other materials such as fillers, pigments, ultraviolet stabilizers, anti-static agents, mold release agents and flame retardants. Materials useful for these purposes, and the proportions useful in the compositions of this invention, will be apparent to those skilled in the art.

The invention is illustrated by the following examples. All parts and percentages are by weight.

EXAMPLES 6–7

Component A was a poly-(2,6-dimethyl-1,4-phenylene ether) having a molecular weight of about 20,000 and an intrinsic viscosity in chloroform at 25° C. of 0.48 dl./g. Component B was one of the following:

Example 6—A phosphonated ethylene-propylene rubber containing free phosphonic acid groups, prepared from that of Example 1 by reaction with gaseous hydrogen chloride, and containing 0.81% phosphorus.

Example 7—A phosphonated ethylene-propylene rubber containing 1.05% phosphorus, prepared by the procedure of Example 1 from a polymer containing 40% ethylene and having a Mooney viscosity (ML-8) at 127° C. of 25.

Components C and D were zinc stearate and triphenyl phosphate, respectively.

The compositions were prepared by blending 71 parts of component A (89.5% of resinous components), 8.3 parts (10.5%) of component B, 8.3 parts (10.5 phr.) of component C and 12.5 parts (15.8 phr.) of component D, mixing in a jar mill for ½ hour and extruding on a twin screw extruder at about 180°–280° C. The extruded material was quenched in water, pelletized and allowed to stand overnight. Test specimens were then prepared by injection molding and tested for Izod impact (ASTM procedure D256), compared with a control in which component B was replaced by an unphosphonated ethylene-propylene copolymer (the precursor of the product of Example 7). The specimens were broken by hand and the fracture surfaces were visually inspected for delamination. The results are given in Table I.

TABLE I

| Example | Impact strength | | Delamination |
| --- | --- | --- | --- |
| | Joules/m. | Ft.-lbs/in. | |
| 6 | 235 | 4.4 | None |
| 7 | 507 | 9.5 | None |
| Control | | | Severe (splintered) |

EXAMPLES 8–9

Component A was a blend of the polyphenylene ether of Examples 6–7 and a commercially available styrene homopolymer having a molecular weight of about 106,000 and an intrinsic viscosity in toluene at 25° C. of 0.80 dl./g. Component B was identical to that of Example 7 except that it contained 0.74% phosphorus. Components C and D were identical to those in Examples 6–7, and component E was the sulfonated polystyrene of Example 5. Blending, extrusion, molding and testing were conducted as described in Examples 6–7.

The results are given in Table II. In Control I, the unphosphonated ethylene-propylene rubber was substituted for the phosphonated polymer; in Control II, the phosphonated polymer contained 0.81% phosphorus and stearic acid was substituted for the zinc stearate.

TABLE II

| | Example | | Control I | Control II |
| --- | --- | --- | --- | --- |
| | 8 | 9 | | |
| Component A, %: | | | | |
| Polyphenylene ether | 64.9 | 64.9 | 64.9 | 64.9 |
| Polystyrene | 16.9 | 14.3 | 16.9 | 16.9 |
| Component B, % | 6.5 | 9.1 | (6.5) | 6.5 |
| Component C, phr. | 11.7 | 11.7 | 11.7 | (11.7) |
| Component D, phr. | 18.2 | 18.2 | 18.2 | 18.2 |
| Component E, % | 11.7 | 11.7 | 11.7 | 11.7 |
| Impact strength: | | | | |
| Joules/m. | 374 | 561 | 41 | 64 |
| Ft.-lb./in. | 7.0 | 10.5 | 0.76 | 1.2 |
| Delamination | None | None | Severe | Slight skin |

EXAMPLES 10–11

The procedure of Example 9 was repeated, using as component B two phosphonated polymers prepared according to the procedure of Example 1 and further characterized as follows:

Example 10—A phosphonated ethylene-propylene rubber containing 1.0% phosphorus, prepared from a polymer containing 75% ethylene and having a Mooney viscosity at 127° C. of 50 ml.-8.

Example 11—A phosphonated linear low density polyethylene containing 0.97% phosphorus, prepared from a polymer having a melt index of 20 g./10 min.

For each example, the corresponding control was an identical blend in which the unphosphonated polymer was substituted for component B. The results are given in Table III.

TABLE III

|  | Example 10 | Control 10 | Example 11 | Control 11 |
|---|---|---|---|---|
| Impact strength: | | | | |
| Joules/m. | 587 | 51 | 107 | 41 |
| Ft.-lb./in. | 11.0 | 0.95 | 2.0 | 0.77 |
| Delamination | None | Severe | None | Severe |

EXAMPLE 12

The blend and conditions were the same as in Example 8, except that a phosphonic acid polymer containing 0.59% phosphorus, prepared from a phosphonic acid ester polymer by hydrolysis, was used as component B. The resulting impact strength was 251 joules/m. (4.7 ft.-lb./in.) with no delamination.

EXAMPLES 13–14

The formulations were the same as in Examples 8–9, except for the identities of component B which were as follows:

Example 13—A phosphonated low density polyethylene prepared by the procedure of Example 2 with alcoholysis with ethanol substituted for hydrolysis, and containing 0.46% phosphorus.

Example 14—A zinc salt of a phosphonated low density polyethylene prepared by the procedure of Example 2, containing 0.88% phosphorus.

The compositions were compared with two controls, Control III in which the phosphonated polymer was replaced by the corresponding unphosphonated polymer and Control IV in which component B was similar to that of Example 14 but contained 2.02% phosphorus. The results are given in Table IV.

TABLE IV

|  | Example 13 | Example 14 | Control III | Control IV |
|---|---|---|---|---|
| Component A polystyrene, % of resinous components | 14.3 | 14.3 | 14.3 | 16.9 |
| Component B, % of resinous components | 9.1 | 9.1 | (9.1) | 6.5 |
| Impact strength: | | | | |
| Joules/m. | 59 | 112 | 33 | — |
| Ft.-lb./in. | 1.1 | 2.1 | 0.62 | — |
| Delamination | None | None | Severe | Not dispersed |

EXAMPLE 15

The blend proportions and conditions were the same as in Example 9, except that component B was the phosphonated EPDM rubber of Example 3. The impact strength was 587 joules/m. (11.0 ft.-lb./in.) with no delamination, compared to 29 joules/m. (0.55 ft.-lb./in.) with severe delamination for a control containing the unphosphonated EPDM.

Over an eight-week period, the impact strength decreased from 587 joules/m. to 182 joules/m. (3.4 ft.-lb./in.). This deterioration can be inhibited by incorporating a minor effective amount of a hindered phenol antioxidant in the composition during the dry blending step.

EXAMPLES 16–17

Two compositions of the invention were used, as follows:

Example 16—A composition identical to that of Example 8, except that component B contained about 0.5% phosphorus.

Example 17—A composition similar to that of Example 9, except that component B was the phosphonated ethylene-propylene rubber of Example 1.

The compositions were melted and charged to a mold maintained at 38° C. They were subsequently annealed for 1 hour in a hot air circulating oven at 77° C. These conditions are known to accelerate stress crack formation. They were compared with controls which were commercially available combinations of polyphenylene ethers with high gloss high impact polystyrenes. Five parts were visually examined and the average crack lengths were determined. The following results were obtained:

Example 16—13.8 cm. (control 27.9 cm.)
Example 17—5.3 cm. (control 28.0 cm.).

What is claimed is:

1. A resinous composition obtained by preparing a blend comprising a major proportion of
   (A) at least one polyphenylene ether selected from the group consisting of:
   (1) those comprising structural units having the formula

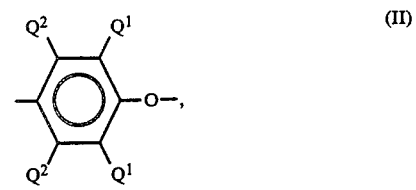

wherein each $Q^1$ and each $Q^2$ is independently hydrogen, halogen, primary or secondary lower alkyl, phenyl, haloalkyl wherein at least two carbon atoms separate the halogen atom from the benzene ring, hydrocarbonoxy, or halohydrocarbonoxy wherein at least two carbon atoms separate the halogen and oxygen atoms; and
   (2) graft copolymers thereof;
   or a blend thereof with at least one polystyrene, and minor proportions of
   (B) at least one hydrocarbon polymer characterized by the presence within its molecular structure of 0.4–1.8% by weight of phosphorus as groups having the formula

wherein $X^1$ is oxygen or sulfur; $R^1$ is lower alkyl or $X^2R^3$; $X^2$ is O, S or $NR^4$; each of $R^2$ and $R^3$ is independently H, one equivalent of a metal or ammonium cation, lower alkyl, halo-substituted lower alkyl or silyl; and $R^4$ is hydrogen or lower alkyl; and (C) at least one fatty acid salt.

2. A composition according to claim 1 wherein $R^1$ is $X^2R^3$, each of $X^1$ and $X^2$ is oxygen and each of $R^2$ and $R^3$ is a cation or lower alkyl, and component C is a zinc salt of a saturated fatty acid.

3. A composition according to claim 2 wherein the polyphenylene ether is a poly(2,6-dimethyl-1,4-phenylene ether) having a number average molecular weight of about 5,000–40,000.

4. A composition according to claim 3 wherein component A consists of said polyphenylene ether.

5. A composition according to claim 4 wherein each of $R^2$ and $R^3$ is hydrogen, methyl or ethyl.

6. A composition according to claim 3 wherein there is additionally blended into said composition (D) at least one additional plasticizer, said plasticizer being a polar material melting at least 50° C. below the processing temperature of the resinous components of the composition.

7. A composition according to claim 6 wherein component D contains at least one of oxygen, phosphorus and nitrogen atoms or releases a small polar molecule at elevated temperatures.

8. A composition according to claim 7 wherein component D is a polar material melting no higher than about 190° C.

9. A composition according to claim 6 wherein component A is a blend of said polyphenylene ether with a polystyrene, said blend containing about 10–90% by weight polyphenylene ether.

10. A composition according to claim 9 wherein component D is at least one non-heterocyclic triaryl phosphate.

11. A composition according to claim 10 wherein there is also blended into said composition (E) at least one non-heterocyclic aromatic polymer containing acidic substituents with a $pK_a$ of at most about 5 or salts thereof, and wherein component B is the reaction product of an ethylene-propylene rubber with a dialkyl vinylphosphonate under free radical conditions, the hydrolyzed or alcoholyzed reaction product of a polyethylene with phosphorus trichloride and oxygen, or the reaction product of a diene rubber with a dialkyl phosphite under free radical conditions.

12. A composition according to claim 11 wherein the polystyrene is a styrene homopolymer having a number average molecular weight of about 50,000–250,000.

13. A composition according to claim 12 wherein each of $R^2$ and $R^3$ is hydrogen, methyl or ethyl.

14. A composition according to claim 13 wherein the substituents on component E are sulfonic acid substituents or salts thereof.

15. A composition according to claim 14 wherein component E is an ionomeric derivative of at least one constituent of component A.

16. A composition according to claim 15 wherein component E is a sulfonated poly(2,6-dimethyl-1,4-phenylene oxide).

17. A composition according to claim 16 wherein the substituents on component E are zinc sulfonate substituents.

18. A composition according to claim 15 wherein component E is a sulfonated styrene homopolymer.

19. A composition according to claim 18 wherein the substituents on component E are zinc sulfonate substituents.

20. A composition according to claim 11 wherein the ingredients are blended in the following proportions, by weight:
Component A—about 60–90%
Component B—about 2–20%
Component C—about 5–20 phr.
Component D—about 5–25 phr.
Component E—about 5–20%.

21. A composition according to claim 20 wherein component C is zinc stearate and component D is triphenyl phosphate.

22. A composition according to claim 20 wherein component B is the reaction product of an ethylene-propylene rubber with a dialkyl vinylphosphonate under free radical conditions.

23. A composition according to claim 20 wherein component B is the hydrolyzed or alcoholyzed reaction product of a polyethylene with phosphorus trichloride and oxygen.

24. A composition according to claim 20 wherein component B is a reaction product of a diene rubber with a dialkyl phosphite under free radical conditions.

25. A composition according to claim 24 wherein component B is a hydrolyzed reaction product.

26. A composition according to claim 20 wherein component B is a reaction product of an EPDM rubber with a dialkyl phosphite under free radical conditions.

27. A composition according to claim 26 wherein component B is a hydrolyzed reaction product.

* * * * *